(12) United States Patent
Togino et al.

(10) Patent No.: US 6,445,507 B2
(45) Date of Patent: Sep. 3, 2002

(54) VIEWING OPTICAL SYSTEM AND IMAGE DISPLAY APPARATUS USING THE SAME

(75) Inventors: Takayoshi Togino, Koganei; Tetsuhide Takeyama, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/796,424

(22) Filed: Mar. 2, 2001

(30) Foreign Application Priority Data

Mar. 3, 2000 (JP) ........................................ 2000-058385

(51) Int. Cl.⁷ .............................................. G20B 27/14
(52) U.S. Cl. ...................... 359/637; 359/630; 359/631; 359/636
(58) Field of Search ................................. 359/630, 631, 359/633, 637, 636

(56) References Cited

U.S. PATENT DOCUMENTS

| | | | | |
|---|---|---|---|---|
| 6,005,720 A | | 12/1999 | Watters et al. | 359/633 |
| 6,134,051 A | * | 10/2000 | Hayakawa et al. | 359/630 |
| 6,246,527 B1 | * | 6/2001 | Hayakawa et al. | 359/630 |
| 6,313,950 B1 | * | 11/2001 | Hayakawa et al. | 359/630 |
| 2001/0021068 A1 | * | 9/2001 | Togino et al. | 359/630 |
| 2002/0015114 A1 | * | 2/2002 | Okuyama et al. | 349/5 |
| 2002/0018295 A1 | * | 2/2002 | Okuyama et al. | 359/443 |
| 2002/0021498 A1 | * | 2/2002 | Ohtaka et al. | 359/629 |

FOREIGN PATENT DOCUMENTS

| | | |
|---|---|---|
| JP | 7-333551 | 12/1995 |
| JP | 8-50256 | 2/1996 |
| JP | 8-234137 | 9/1996 |
| JP | 10-268306 | 10/1998 |
| JP | 11-194295 | 7/1999 |

* cited by examiner

*Primary Examiner*—Georgia Epps
*Assistant Examiner*—David N. Spector
(74) *Attorney, Agent, or Firm*—Pillsbury Winthrop LLP

(57) ABSTRACT

A compact, bright and high-performance viewing optical system capable of color display has a reflection type image display device, an ocular optical system and an illuminating device formed from a plurality of juxtaposed illuminating light sources of different colors. An illuminating light guide optical device is placed between the entrance pupil and the reflection type image display device. The ocular optical system includes a decentered prism formed from a medium surrounded by three optical surfaces and having a refractive index larger than 1. A chromatic aberration producing device is placed between the entrance pupil and the illuminating light guide optical device. The chromatic aberration producing device is arranged to superimpose the images of the plurality of illuminating light sources on one another in the exit pupil.

12 Claims, 8 Drawing Sheets

FIG. 5
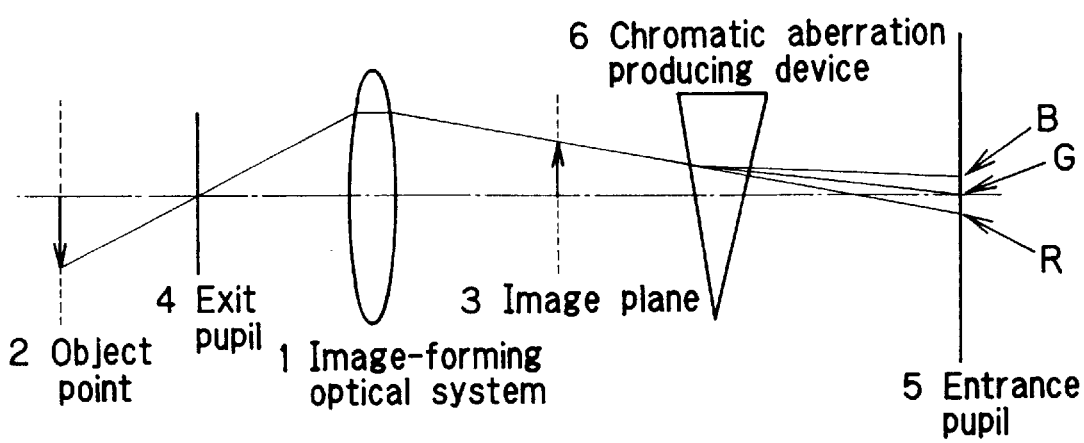
FIG. 6(a)  FIG. 6(b)
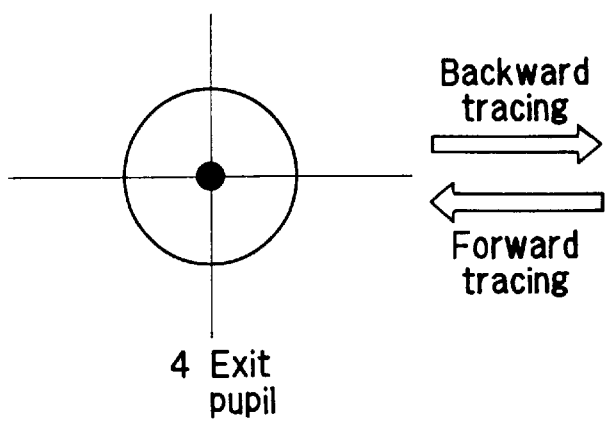
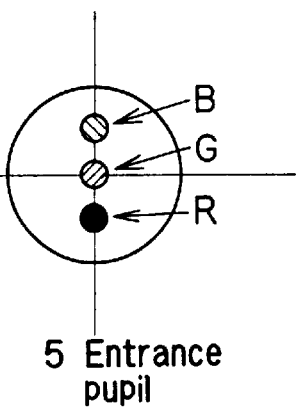

VIEWING OPTICAL SYSTEM AND IMAGE DISPLAY APPARATUS USING THE SAME

This application claims benefit of Japanese Application No. 2000-58385 filed in Japan on Mar. 3, 2000, the contents of which are incorporated by this reference.

BACKGROUND OF THE INVENTION

1. Field of the Invention

The present invention relates to a viewing optical system and an image display apparatus using the same. More particularly, the present invention relates to a viewing optical system devised to allow observation of a bright image of a display device of the type in which an image is displayed by reflected light, e.g. a reflection type liquid crystal display device, through an ocular optical system arranged to be compact in size and to minimize the loss of light quantity. The present invention also relates to an image display apparatus, e.g. a head-up display, using the viewing optical system.

2. Discussion of Related Art

In recent years, with the development of head-up displays and glasses-type displays, compact ocular optical systems have been actively developed. As a result, ocular optical systems using a thin and compact decentered prism have been proposed as disclosed, for example, in Japanese Patent Application Unexamined Publication Numbers (hereinafter referred to as "JP(A)") Hei 7-333551, 8-50256 and 8-234137. These are compact ocular optical systems in which reflecting surfaces have a power and the optical path is folded, and in which rotationally asymmetric decentration aberrations produced by decentered reflecting surfaces with a power are corrected by using an anamorphic reflecting surface or a rotationally asymmetric reflecting surface having one plane of symmetry.

Regarding liquid crystal display devices for displaying an image for observation, reflection type liquid crystal display devices have been developed to form images that are brighter and easier to observe. As a reflection type liquid crystal display device including an illumination structure therefor, JP(A) Hei 10-268306 has been laid open to public.

Under these circumstances, the present applicant proposed in Japanese Patent Application Nos. Hei 11-96291, 11-176390 and 11-281031 an image display apparatus including a reflection type liquid crystal display device and an ocular optical system formed from a decentered prism, wherein an illuminating light guide prism is placed between the reflection type liquid crystal display device and the decentered prism.

Incidentally, the present applicant proposed in JP(A) Hei 11-194295 an image display apparatus for displaying color images, wherein a chromatic aberration producing device, e.g. a spectral prism, is provided to display a chromatic aberration-free color image of a color image display device by using a light source device formed from a plurality of juxtaposed illuminating light sources, e.g. LEDs, of different colors, e.g. R (red), G (green) and B (blue).

SUMMARY OF THE INVENTION

The present invention was made in view of the above-described circumstances. Accordingly, an object of the present invention is to provide a viewing optical system including a reflection type liquid crystal display device, a decentered prism and an illuminating light guide prism placed therebetween. More specifically, the present invention provides a compact, bright and high-performance viewing optical system capable of color display by using a light source device formed from a plurality of juxtaposed light sources of different colors as an illuminating light source, and also provides an image display apparatus using the viewing optical system.

To attain the above-described object, the present invention provides a viewing optical system including a reflection type image display device placed in an image plane and an ocular optical system for leading an image displayed on the reflection type image display device to the position of an exit pupil where an observer's eyeball is to be placed. An illuminating device is placed at the position of an entrance pupil conjugate to the exit pupil with respect to the ocular optical system. The illuminating device is formed from a plurality of juxtaposed illuminating light sources of different colors. The viewing optical system further includes an illuminating light guide optical device for guiding an illuminating light beam from the illuminating device. The illuminating light guide optical device is placed between the entrance pupil and the reflection type image display device so that the illuminating light beam can be applied to the display surface of the reflection type image display device from the front side thereof. The ocular optical system includes a decentered prism formed from a medium surrounded by three optical surfaces and having a refractive index larger than 1. The decentered prism has an entrance surface through which a display light beam reflected from the reflection type image display device enters the decentered prism after passing through the illuminating light guide optical device, and a first reflecting surface for reflecting the light beam entering through the entrance surface. The decentered prism further has a second reflecting surface for reflecting the light beam reflected from the first reflecting surface, and an exit surface through which the light beam reflected from the second reflecting surface exits the decentered prism. The first reflecting surface and the exit surface are formed from a single surface serving as both a refracting surface and a reflecting surface. A chromatic aberration producing device is placed between the entrance pupil and the illuminating light guide optical device. The chromatic aberration producing device is arranged to superimpose the images of the plurality of illuminating light sources on one another in the exit pupil.

Thus, the present invention provides a compact, bright and high-performance viewing optical system for head-up displays and glasses-type displays and also provides an image display apparatus using the viewing optical system by combining together a reflection type image display device, an illuminating light guide optical device, a decentered prism as an ocular optical system, and a chromatic aberration producing device. Even in a case where a light source device formed from a plurality of juxtaposed light sources of different colors is used as an illuminating light source, the viewing optical system allows observation of a clear color image free from chromatic aberration even if the observer's pupil position deviates from the exit pupil position.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 5 is a ray path diagram showing a basic form of an optical system based on a principle that allows color image display free from chromatic aberration.

FIG. 6 is a diagram showing the relationship between the images of exit and entrance pupils in FIG. 5.

DESCRIPTION OF THE PREFERRED EMBODIMENTS

Figure 1:
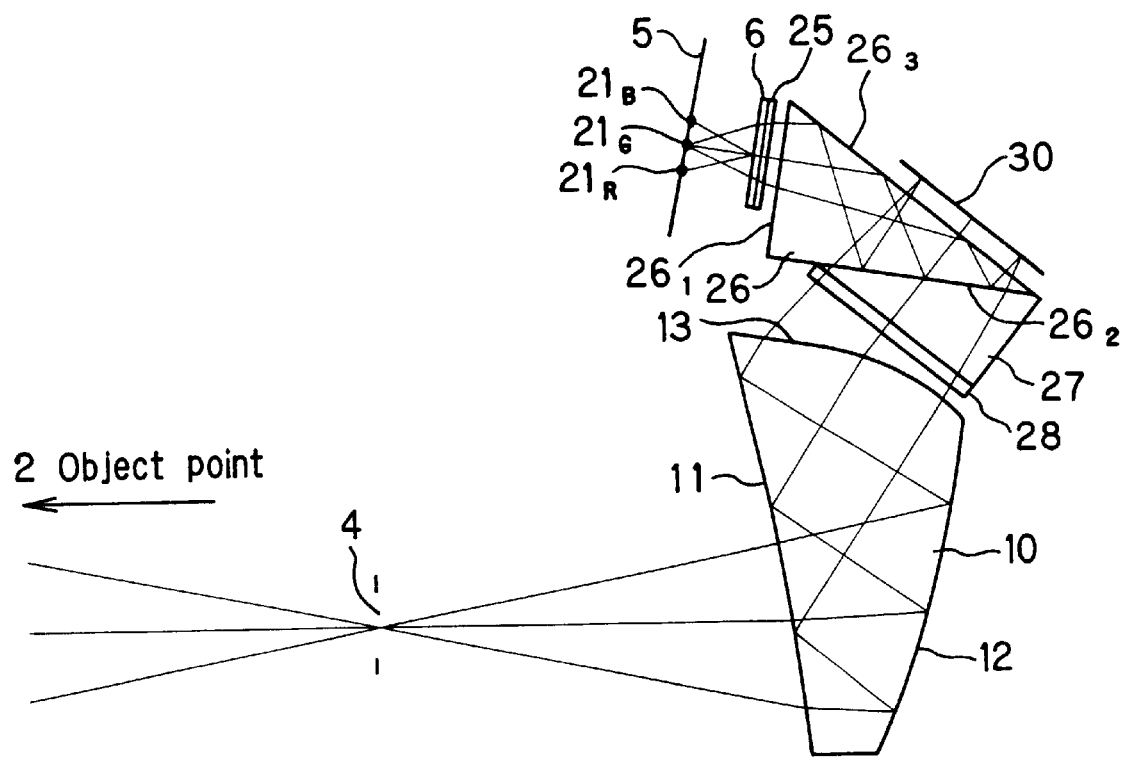
FIG. 1 is a sectional view showing a basic arrangement of the viewing optical system according to the present invention.

Examples of the viewing optical system according to the present invention, together with examples of the image display apparatus using the viewing optical system, will be described below.

First, let us describe a principle that allows color image display free from chromatic aberration by using an illuminating light source formed from a plurality of light sources of different colors placed in a side-by-side relation to each other as disclosed in JP(A) Hei 11-194295. FIG. 5 shows a basic form of an optical system based on this principle. The optical system has as a basic structure an image-forming optical system 1 constituting an ocular optical system or a projection optical system. With respect to the image-forming optical system 1, an object point 2 and an image plane 3 have been determined in a conjugate relation to each other. When this optical system is actually used as an ocular optical system or a projection optical system, the image plane 3 is the display plane of an image display device or the film plane, and the object point 2 is on a real image plane or a virtual image plane (in the case of a virtual image, the position of the object point 2 is on the same side as the image plane 3 with respect to the image-forming optical system 1).

Let us consider the above-described optical system by backward ray tracing in which light rays are traced from the object point 2 toward the image plane 3 (the reason for the backward ray tracing is that the optical system is assumed to be an ocular optical system). There is an exit pupil 4 in the image-forming optical system 1. The pupil 4 is an exit pupil in the forward ray tracing; it is an entrance pupil in the backward ray tracing. An entrance pupil 5 (an exit pupil in the backward ray tracing) is located at a position on the side of the image plane 3 remote from the image-forming optical system 1. The entrance pupil 5 is in a conjugate relation to the exit pupil 4. A chromatic aberration producing device 6 as shown in examples (described later) is placed between the image plane 3 and the entrance pupil 5. Consequently, light from the object point 2 that passes through the center of the exit pupil 4 passes through the image-forming optical system 1 and the image plane 3 and enters the chromatic aberration producing device 6 where chromatic aberration is introduced into the light. As a result, the light separates for each wavelength on the entrance pupil 5 as shown in FIG. 5. The chromatic aberrations on the entrance pupil 5 are those in the image of the exit pupil 4 that is projected onto the entrance pupil 5. It should be noted that FIG. 5 shows the positions of only three wavelengths R, G and B on the entrance pupil 5.

FIG. 6 is a diagram showing the relationship between the images of the exit and entrance pupils 4 and 5. An image in the exit pupil 4 shown in part (a) of FIG. 6 is chromatically aberrated by the chromatic aberration producing device 6 and projected onto the entrance pupil 5 to form an image for each of the colors R, G and B as shown in part (b) of FIG. 6. If monochromatic light sources of R, G and B are placed individually on the entrance pupil 5, which is conjugate to the exit pupil 4, in alignment with the positions of chromatic aberrations in the pupil image produced in the backward ray tracing, it is possible to eliminate chromatic aberrations in the exit pupil 4 in the forward ray tracing. Accordingly, even if the observer's pupil position deviates from the exit pupil 4 in the case of an ocular optical system, for example, it is possible to observe a clear image, which is free from chromatic aberration.

The above-described arrangement makes it possible to place a plurality of illuminating light sources of different colors in a side-by-side relation to each other and hence possible to reduce the overall size and weight of a head-mounted image display apparatus or color film projection apparatus that uses the above-described optical system as an ocular optical system or a projection optical system.

Furthermore, it is only necessary to provide at least one chromatic aberration producing device 6. Therefore, the desired performance can be obtained more easily and at lower cost than in the case of the conventional optical system using a plurality of color filters or dichroic mirrors. Moreover, because the structure of the whole apparatus reduces in size, the overall weight of the apparatus can be reduced.

The following is a description of examples of the chromatic aberration producing device 6. All the following examples will be described on the basis of the backward ray tracing. In actuality, an image display device is placed in the image plane 3, and illuminating light sources of three colors, i.e. R, G and B, which may be LEDs or the like, are placed at the corresponding chromatic aberration points on the entrance pupil 5. In addition, a virtual image plane is located at the position of the object point 2. It should be noted that the image display device is usually a transmission or reflection type LCD (liquid crystal display), a color film slide or the like. It should also be noted that the following optical systems operate as stated in connection with FIG. 5.

Figure 7:
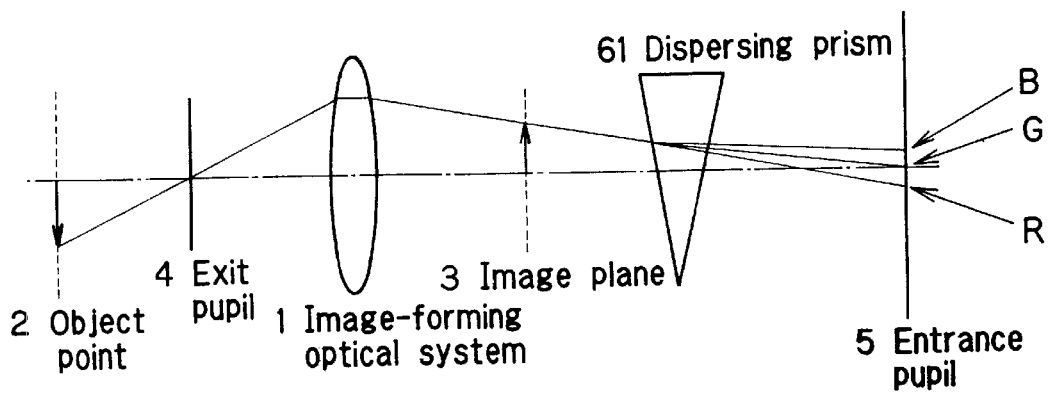
FIG. 7 is a ray path diagram showing an optical system using an example of a chromatic aberration producing device used in the present invention.

FIG. 7 is a ray path diagram showing an optical system using one example of the chromatic aberration producing device 6. With respect to an image-forming optical system 1, an object point 2 and an image plane 3 have been determined in a conjugate relation to each other. In addition, an exit pupil 4 and an entrance pupil 5 have been determined in a conjugate relation to each other. The entrance pupil 5 is located at a position on the side of the image plane 3 remote from the image-forming optical system 1. The image-forming optical system 1 is corrected for various aberrations, including chromatic aberration, to such an extent that the aberrations are ignorable. In this example, a dispersing prism (spectral prism) 61 having chromatic dispersion is placed between the image plane 3 and the entrance pupil 5 as a chromatic aberration producing device 6. A plate glass having chromatic dispersion may be placed at an angle to the optical axis (shown by the chain line in the figure) in place of the dispersing prism 61. The plate glass also functions effectively as a chromatic aberration producing device 6.

Figure 8:
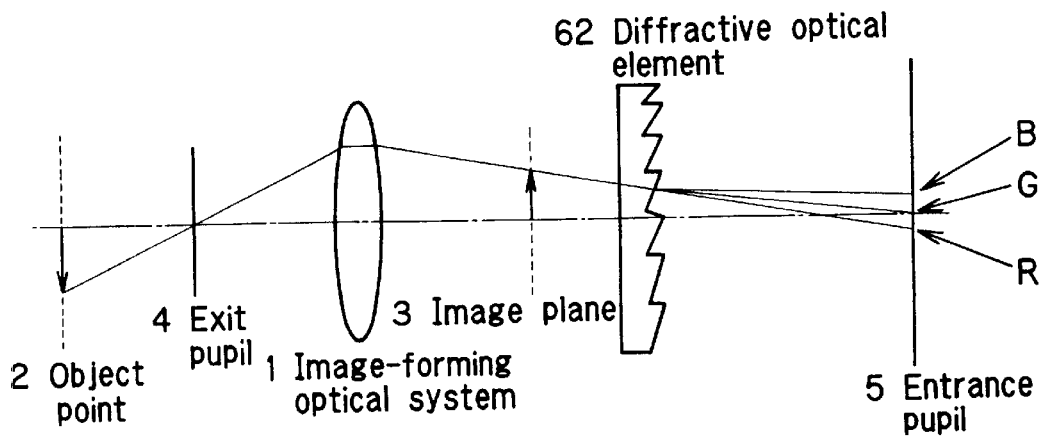
FIG. 8 is a ray path diagram showing an optical system using another example of the chromatic aberration producing device.

FIG. 8 is a ray path diagram showing an optical system using another example of the chromatic aberration producing device 6. An image-forming optical system 1, an object point 2, an image plane 3, an exit pupil 4 and an entrance pupil 5 are placed as in the case of FIG. 7. A diffractive optical element 62, e.g. a diffraction grating or a DOE, is placed between the image plane 3 and the entrance pupil 5 as a chromatic aberration producing device 6 (see FIG. 5).

Figure 9:
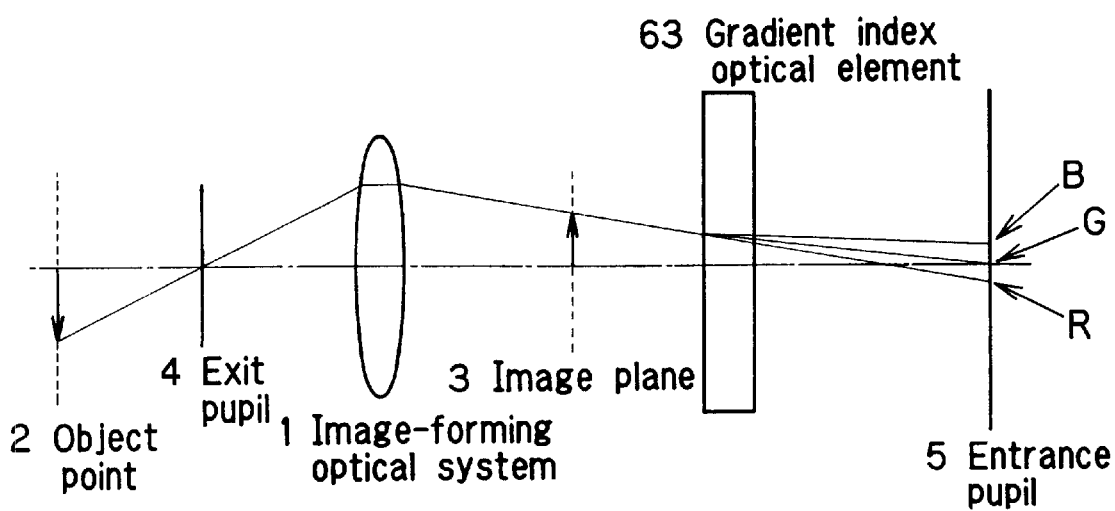
FIG. 9 is a ray path diagram showing an optical system using still another example of the chromatic aberration producing device.

FIG. 9 is a ray path diagram showing an optical system using still another example of the chromatic aberration producing device 6. An image-forming optical system 1, an object point 2, an image plane 3, an exit pupil 4 and an entrance pupil 5 are placed as in the case of FIG. 7. A gradient index optical element 63 having chromatic dispersion is placed between the image plane 3 and the entrance pupil 5 as a chromatic aberration producing device 6 (see FIG. 5).

Figure 10:
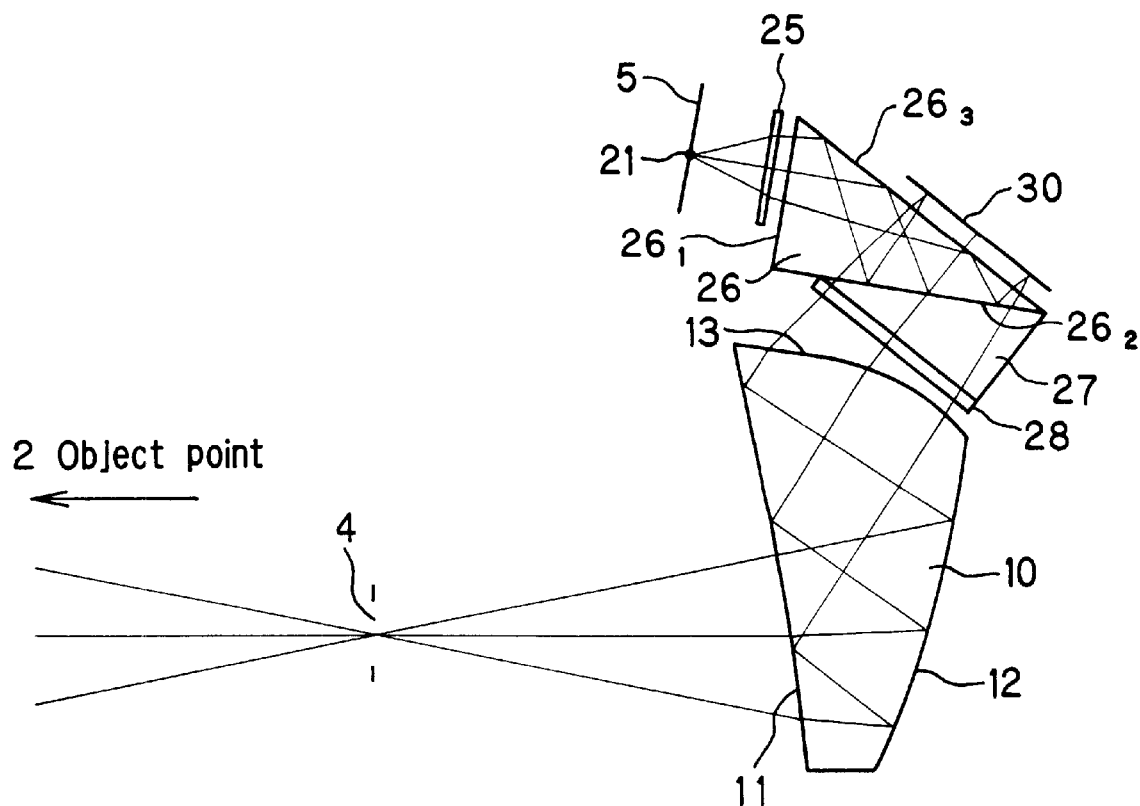
FIG. 10 is a sectional view showing a viewing optical system in which an illuminating light guide prism is placed between a reflection type image display device and a decentered prism.

Incidentally, to observe an image displayed on a reflection type image display device, e.g. a reflection type liquid crystal display device, through an ocular optical system using a decentered prism formed from three optical surfaces, a viewing optical system is arranged as shown in FIG. 10 (Japanese Patent Application Nos. Hei 11-96291, 11-176390 and 11-281031). In the viewing optical system, an illuminating light guide prism is placed between the reflection type image display device and the decentered prism to illuminate the reflection type image display device.

The viewing optical system shown in FIG. 10 has, in order in which light passes from the object side in backward ray tracing, an exit pupil 4, a decentered prism 10, a diffractive optical element 28, a deviation angle compensating prism 27, an illuminating light guide prism 26, and an image plane (i.e. the display surface of a reflection type image display device) 30. A light source 21 and a light collecting element 25, e.g. a Fresnel lens, are disposed on the illuminating light entrance side of the illuminating light guide prism 26. The light source 21 is disposed at the position of the entrance pupil 5. The diffractive optical element 28, the deviation angle compensating prism 27 and the light collecting element 25 are not always necessary.

The decentered prism 10 has a first surface 11, a second surface 12 and a third surface 13. The first surface 11 allows a light beam from the object side to enter the prism 10 and reflects the light beam reflected from the second surface 12 within the prism 10. The second surface 12 reflects the light beam entering through the first surface 11 within the prism 10. The third surface 13 allows the light beam reflected from the first surface 11 to exit the prism 10. Thus, the first surface 11 is an optical functional surface having both a transmitting optical action and a reflecting optical action.

The illuminating light guide prism 26 is a triangular prism having a first surface $26_1$, a second surface $26_2$ and a third surface $26_3$. The first surface $26_1$ is a surface through which a light beam from the light source 21 is introduced into the prism 26 through the light collecting element 25. The introduced illuminating light is totally reflected by the third surface $26_3$ and further reflected by the second surface $26_2$, which is a cemented surface between the illuminating light guide prism 26 and the deviation angle compensating prism 27 and forms a polarization beam splitter surface. Then, the reflected light passes through the third surface $26_3$ to illuminate the display surface of a reflection type image display device, e.g. a reflection type liquid crystal display device, placed in the image plane 3. The illuminating light is incident on the display surface approximately at right angles thereto.

Display light from the display surface of the reflection type liquid crystal display device placed in the image plane 3 enters the illuminating light guide prism 26 through the third surface $26_3$ and passes through the polarization beam splitter surface as the second surface $26_2$ to enter the deviation angle compensating prism 27. Then, the light passes through the diffractive optical element 28, which is placed on the exit-side surface of the deviation angle compensating prism 27. The light is diffracted by the diffraction surface of the diffractive optical element 28 to enter the prism 10 through the third surface 13. The light is totally reflected by the first surface 11 and further reflected by the second surface 12 to exit the prism 10 while being refracted through the first surface 11. Then, the light enters the observer's eyeball placed at the position of the exit pupil 2 to form an enlarged image of the displayed image of the reflection type liquid crystal display device. It should be noted that the object point 2, which is conjugate to the image plane 3, is far away from the exit pupil 4.

In the present invention, a viewing optical system having a basic arrangement as shown in FIG. 10 is allowed to display a color image free from chromatic aberration of the light source by providing the chromatic aberration producing device 6 as described above in connection with FIGS. 5 to 9 between the entrance pupil 5 and the illuminating light guide prism 26. The arrangement of the viewing optical system is shown in FIG. 1. The viewing optical system will be described below.

The arrangement of the ocular optical system is the same as that in FIG. 10. A decentered prism 10 constituting the ocular optical system is formed from a transparent medium surrounded by a first surface 11, a second surface 12 and a third surface 13 and having a refractive index larger than 1. The first surface 11 allows a light beam from the object side to enter the prism 10 and reflects the light beam reflected from the second surface 12 within the prism 10. The second surface 12 reflects the light beam entering through the first surface 11 within the prism 10. The third surface 13 allows the light beam reflected from the first surface 11 to exit the prism 10. Thus, the first surface 11 is an optical functional surface having both a transmitting optical action and a reflecting optical action.

The display surface of a reflection type liquid crystal display device is placed in an image plane 30 at the third surface 13 side of the decentered prism 10. An illuminating light guide prism 26, a deviation angle compensating prism 27 and a diffractive optical element 28 are placed between the image plane 30 and the third surface 13 of the decentered prism 10. The deviation angle compensating prism 27 is cemented to a second surface $26_2$ of the illuminating light guide prism 26 on the side thereof closer to the decentered prism 10. The diffractive optical element 28 is cemented to the side of the deviation angle compensating prism 27 closer to the decentered prism 10.

The illuminating light guide prism 26 is a triangular prism having a first surface $26_1$, a second surface $26_2$ and a third surface $26_3$. The first surface $26_1$ is a surface facing the entrance pupil 5 of the ocular optical system, through which light beams from light sources $21_R$, $21_G$ and $21_B$ juxtaposed in the entrance pupil 5 are introduced into the prism 26. The third surface $26_3$ faces the image plane 30 and totally reflects the illuminating light introduced through the first surface $26_1$. The second surface $26_2$ is a polarization beam splitter surface for reflecting a predetermined polarized light component (e.g. p-polarized light component) of the illuminating light totally reflected from the third surface $26_3$.

A light collecting element 25, e.g. a Fresnel lens, is disposed to face the first surface $26_1$ of the illuminating light guide prism 26. Light sources formed from LEDs or the like, i.e. a light source $21_R$ of R (red), a light source $21_G$ of G (green), and a light source $21_B$ of B (blue), are placed in a side-by-side relation to each other in the plane of the entrance pupil 5, which is in a conjugate relation to the exit pupil 4 when the image plane 30 is a reflecting surface. A chromatic aberration producing device 6 having an arrangement and function such as those described in connection with FIGS. 5 to 9 (e.g. the diffractive optical element 62) is provided on the light source side of the light collecting element 25.

With the above-described arrangement, R, G and B light from the R light source $21_R$, the G light source $21_G$ and the B light source $21_B$, which are placed in a side-by-side relation to each other in the plane of the entrance pupil 5, enter the chromatic aberration producing device 6 at different incident angles because the light emission positions are displaced with respect to each other. However, after passing through the chromatic aberration producing device 6, the R, G and B light exit at approximately the same angle owing to the chromatic aberration producing action of the device 6. Then, the R, G and B light become approximately parallel light beams through the light collecting element 25. The illuminating light is introduced into the illuminating light guide prism 26 through the first surface $26_1$ and totally reflected by the third surface $26_3$. The reflected illuminating light is reflected by the second surface $26_2$, which is a cemented surface between the illuminating light guide prism 26 and the deviation angle compensating prism 27 and forms a polarization beam splitter surface. Then, the reflected light passes through the third surface $26_3$ to illuminate the display surface of a reflection type image display device, e.g. a reflection type liquid crystal display device, placed in the image plane 30. The illuminating light is incident on the display surface approximately at right angles thereto.

Display light from the display surface of the reflection type liquid crystal display device placed in the image plane 30 enters the illuminating light guide prism 26 through the third surface $26_3$ and passes through the polarization beam splitter surface as the second surface $26_2$ to enter the deviation angle compensating prism 27. Then, the light is diffracted by the diffraction surface of the diffractive optical element 28, which is placed at the exit side of the deviation angle compensating prism 27. The light enters the prism 10 through the third surface 13 and is totally reflected by the first surface 11 and further reflected by the second surface 12 to exit the prism 10 while being refracted through the first surface 11. Then, the light enters the observer's eyeball placed at the position of the exit pupil 2 to form an enlarged image of the displayed image of the reflection type liquid crystal display device.

At this time, R, G and B light from the R, G and B light sources juxtaposed in the plane of the entrance pupil 5 as shown in part (b) of FIG. 6 are chromatically aberrated by the chromatic aberration producing device 6, so that, as shown in part (a) of FIG. 6, the images of the R, G and B light sources are superimposed on one another in the exit pupil 4. Therefore, even if the observer's pupil position deviates from the exit pupil 4 position, it is possible to observe a clear image, which is free from chromatic aberration.

The decentered prism 10 constituting the ocular optical system is preferably arranged such that at least one surface having a reflecting action, particularly the second surface 12, is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

The above-described rotationally asymmetric surface should preferably be a plane-symmetry free-form surface having only one plane of symmetry. Free-form surfaces used in the present invention are defined by the following equation (a).

$$Z = cr^2 / \left[ 1 + \sqrt{\{1 - (1+k)c^2 r^2\}} \right] + \sum_{j=2}^{66} C_j X^m Y^n \quad (a)$$

In Eq. (a), the first term is a spherical surface term, and the second term is a free-form surface term.

In the spherical surface term:

c: the curvature at the vertex k: a conic constant $r = \sqrt{(X^2 + Y^2)}$

The free-form surface term is given by $$\sum_{j=2}^{66} C_j X^m Y^n = C_2 X + C_3 Y +$$

$$C_4 X^2 + C_5 XY + C_6 Y^2 +$$

$$C_7 X^3 + C_8 X^2 Y + C_9 XY^2 + C_{10} Y^3 +$$

$$C_{11} X^4 + C_{12} X^3 Y + C_{13} X^2 Y^2 +$$

$$C_{14} XY^3 + C_{15} Y^4 +$$

$$C_{16} X^5 + C_{17} X^4 Y + C_{18} X^3 Y^2 +$$

$$C_{19} X^2 Y^3 + C_{20} XY^4 +$$

$$C_{21} Y^5 +$$

$$C_{22} X^6 + C_{23} X^5 Y + C_{24} X^4 Y^2 +$$

$$C_{25} X^3 Y^3 + C_{26} X^2 Y^4 +$$

$$C_{27} XY^5 + C_{28} Y^6 +$$

$$C_{29} X^7 + C_{30} X^6 Y + C_{31} X^5 Y^2 +$$

$$C_{32} X^4 Y^3 + C_{33} X^3 Y^4 +$$

$$C_{34} X^2 Y^5 + C_{35} XY^6 + C_{36} Y \ldots$$

where $C_j$ (j is an integer of 2 or higher) are coefficients.

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . are set equal to zero. By doing so, it is possible to obtain a free-form surface having only one plane of symmetry parallel to the YZ-plane.

A free-form surface having only one plane of symmetry parallel to the XZ-plane is obtained by making all terms of odd-numbered degrees with respect to Y zero. For example, in the above defining equation (a), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, productivity can be improved.

It should be noted that the above defining equation (a) is shown as merely an example, and that the feature of the present invention resides in that rotationally asymmetric aberrations due to decentration are corrected and, at the same time, productivity is improved by using a rotationally asymmetric surface having only one plane of symmetry. Therefore, the same advantageous effect can be obtained for any other defining equation that expresses such a rotationally asymmetric surface.

It should be noted that the first surface 11 of the decentered prism 10 may be formed from a rotationally symmetric surface, e.g. a spherical surface or an axially symmetric aspherical surface, in place of a rotationally asymmetric surface.

The above-described viewing optical system according to the present invention can be used as an optical system of a head-mounted image display apparatus, for example. Examples of such image display apparatus will be described below.

Figure 2:
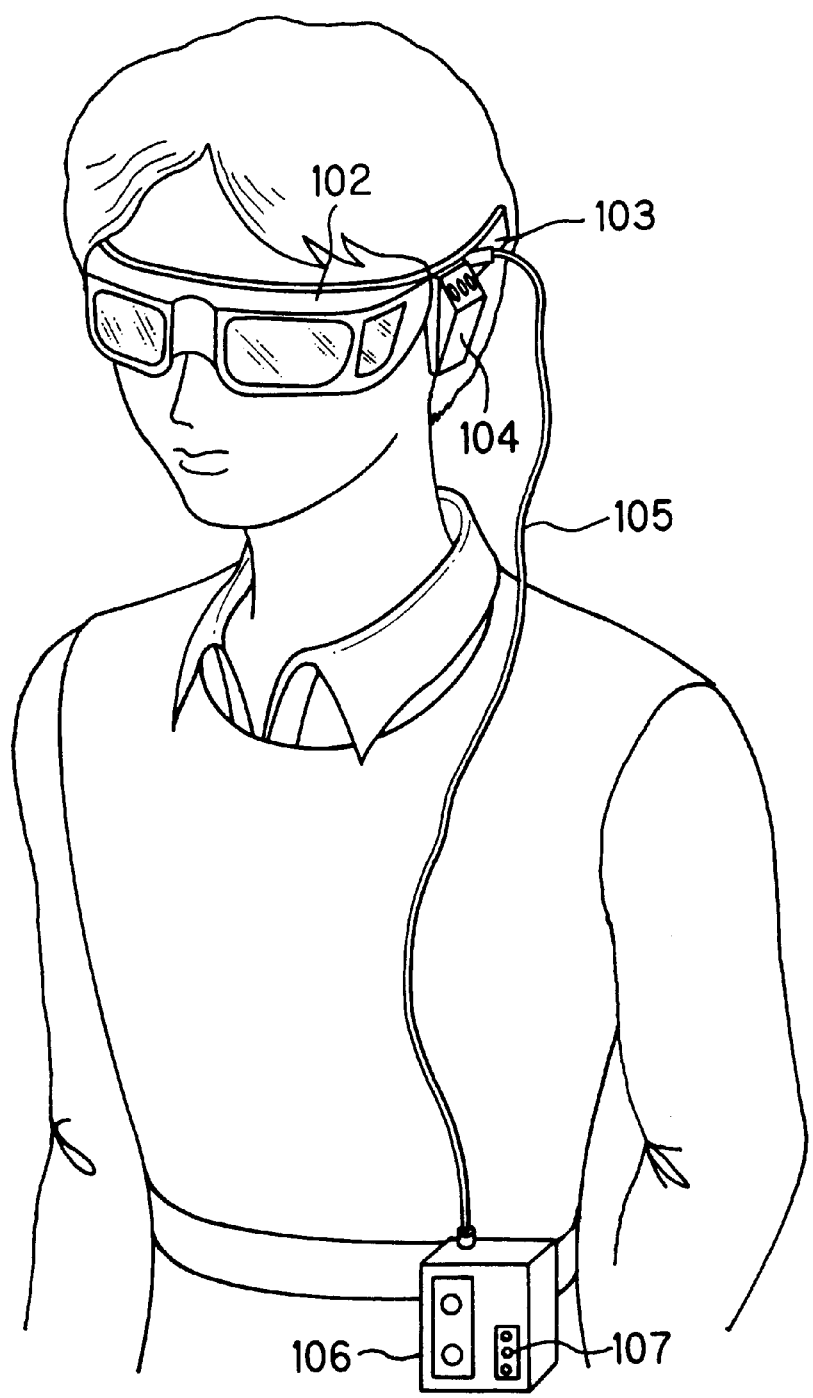
FIG. 2 is a diagram showing a head-mounted image display apparatus for both eyes using the viewing optical system according to the present invention in a state where it is fitted on an observer's head.
Figure 3:
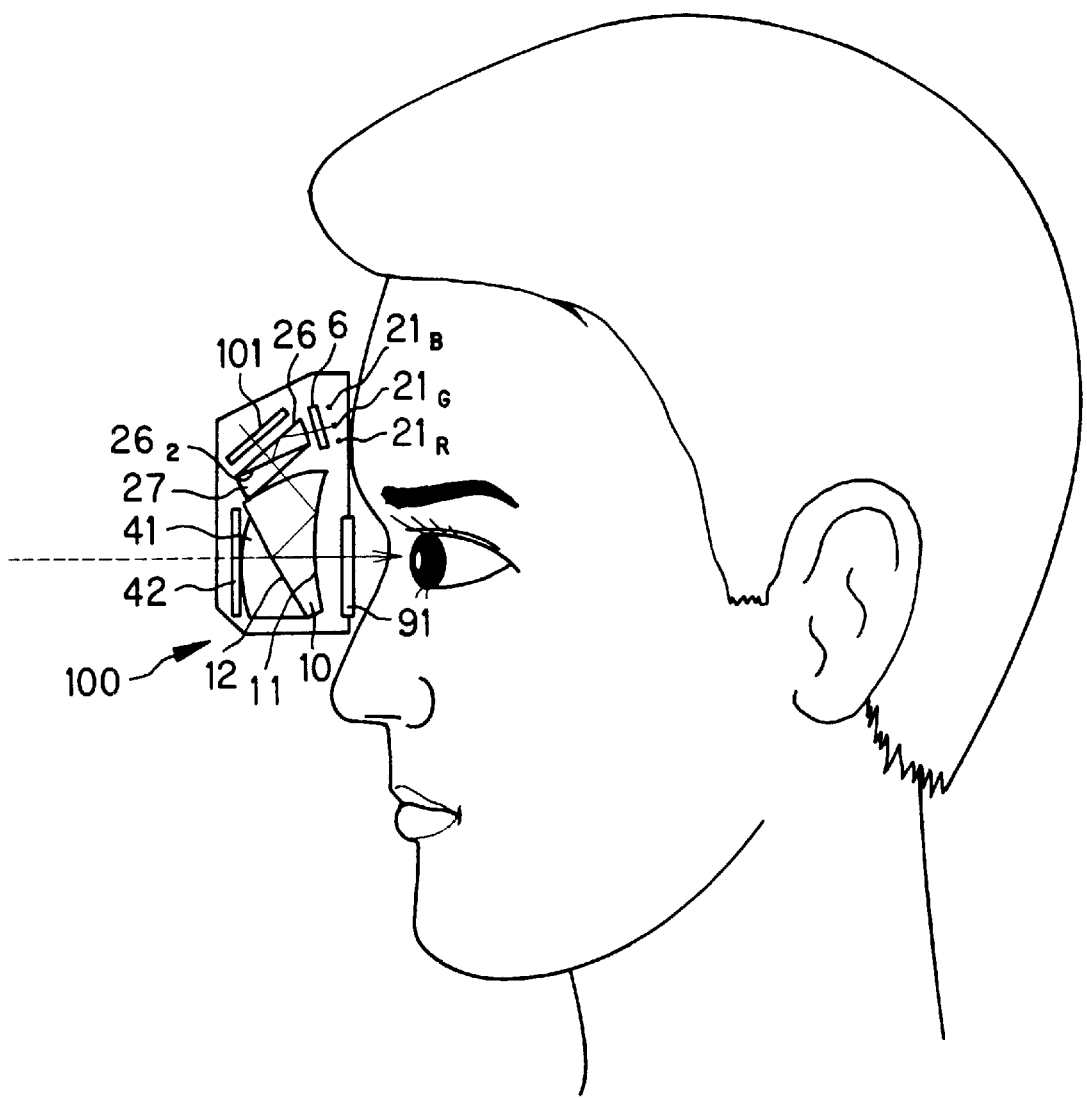
FIG. 3 is a sectional view of the head-mounted image display apparatus shown in FIG. 2.

FIG. 2 shows a head-mounted image display apparatus arranged for two eyes in a state where the image display apparatus is fitted on an observer's head. FIG. 3 is a sectional view of the image display apparatus. As shown in FIG. 3, the viewing optical system according to the present invention is used as an ocular optical system 100 of the image display apparatus. A pair of combinations of an ocular optical system 100 and a reflection type image display device 101 are prepared for the left and right eyes and supported apart from each other by the interpupillary distance, i.e. the distance between the two eyes, thereby forming a stationary or portable image display apparatus 102, such as a head-mounted image display apparatus, which enables the observer to see with both eyes.

More specifically, the display apparatus body unit 102 is equipped with a pair of ocular optical systems 100 (left and right). The above-described viewing optical system is used as each ocular optical system 100. Reflection type image display devices 101, which are reflection type liquid crystal display devices, are disposed in the respective image planes of the two ocular optical systems 100. As shown in FIG. 2, the display apparatus body unit 102 is provided with temporal frames 103 that are contiguous with the left and right ends thereof so that the display apparatus body unit 102 can be held in front of the observer's eyes. As shown in FIG. 3, to protect the first surface 11 (see FIG. 1) of the prism 10 in the ocular optical system 100 of each image display apparatus 102, a cover member 91 is placed between the exit pupil of the ocular optical system 100 and the first surface 11. As the cover member 91, any of a plane-parallel plate, a positive lens and a negative lens can be used.

Further, a speaker 104 is provided on each temporal frame 103 to enable the user to enjoy listening to stereophonic sound in addition to image observation. The display apparatus body unit 102 having the speakers 104 is connected with a replaying unit 106, e.g. a portable video cassette unit, through an image and sound transmitting cord 105. Therefore, the user can enjoy not only observing an image but also listening to sound with the replaying unit 106 retained on a desired position, e.g. a belt, as illustrated in FIG. 2. Reference numeral 107 in FIG. 2 denotes a switch and volume control part of the replaying unit 106. It should be noted that the display apparatus body unit 102 contains electronic parts such as image and sound processing circuits.

The cord 105 may have a jack and plug arrangement attached to the distal end thereof so that the cord 105 can be detachably connected to an existing video deck. The cord 105 may also be connected to a TV signal receiving tuner so as to enable the user to enjoy watching TV. Alternatively, the cord 105 may be connected to a computer to receive computer graphic images or message images or the like from the computer. To eliminate the bothersome cord, the image display apparatus may be arranged to receive external radio signals through an antenna connected thereto.

Figure 4:
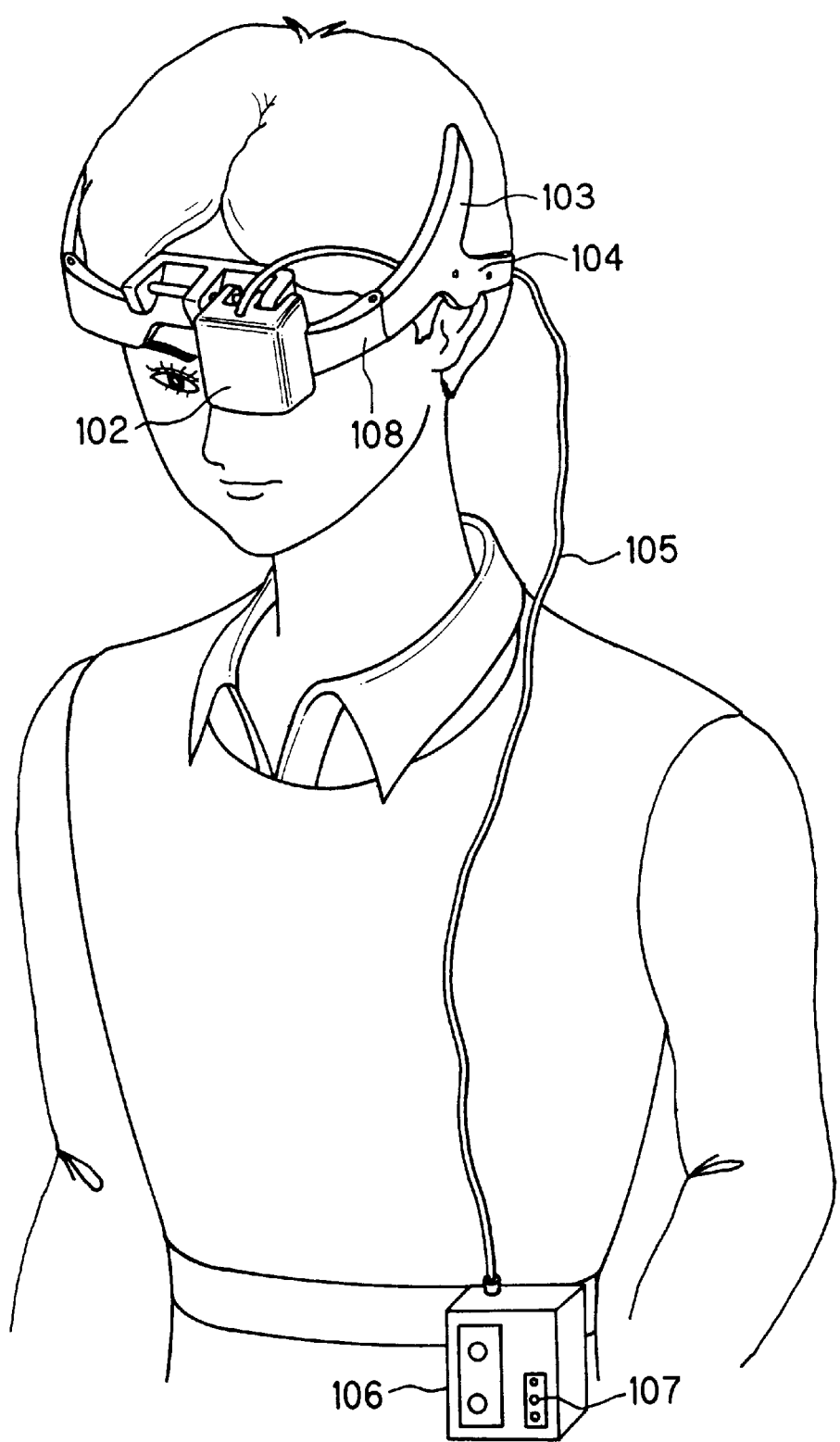
FIG. 4 is a diagram showing a head-mounted image display apparatus for a single eye using the viewing optical system according to the present invention in a state where it is fitted on an observer's head.

The viewing optical system according to the present invention may also be used in a head-mounted image display apparatus for a single eye by placing the ocular optical system in front of either of the left and right eyes. FIG. 4 shows the head-mounted image display apparatus for a single eye in a state where it is fitted on an observer's head (in this case, the apparatus is fitted for the left eye). In the illustrated arrangement, a display apparatus body unit 102 includes a single combination of an ocular optical system 100 and a reflection type image display device 101. The display apparatus body unit 102 is mounted on a front frame 108 so as to lie in front of the associated eye of the observer. As shown in FIG. 4, the front frame 108 is provided with temporal frames 103 that are contiguous with the left and right ends thereof so that the display apparatus body unit 102 can be held in front of one eye of the observer. The arrangement of the rest of the apparatus is the same as in the case of FIG. 2. Therefore, a description thereof is omitted.

Incidentally, to allow the outside world image and the displayed image to be viewed simultaneously or selectively in the above-described head-mounted image display apparatus for both eyes or a single eye using the viewing optical system according to the present invention, it is desirable that, as shown in FIG. 3, a semi-transparent reflecting surface should be used as the reflecting surface 12, which faces the exit pupil, of the decentered prism 10 constituting the ocular optical system 100, and another decentered prism 41 for compensating for an angle of deviation or power produced by the decentered prism 10 should be placed in contact with or at a slight distance from the semitransparent reflecting surface 12, thereby allowing the outside world to be viewed through the two decentered prisms 10 and 41. In this case, it is desirable that a shutter 42 such as a liquid crystal shutter that selectively cuts off or passes outside world light shown by the dashed line should be placed on the entrance side of the decentered prism 41 (i.e. on the side of the prism 41 remote from the observer's eye). In this case, when the shutter 42 is opened, the outside world image can be viewed (in a see-through manner), or a superimposed image of the outside world image and the displayed image can be viewed. When the shutter 42 is closed, the displayed image of the display device 101 can be viewed.

As will be clear from the foregoing description, it is possible according to the present invention to provide a compact, bright and high-performance viewing optical system for head-up displays and glasses-type displays and also provide an image display apparatus using the viewing optical system by combining together a reflection type image display device, an illuminating light guide optical device, a decentered prism as an ocular optical system, and a chromatic aberration producing device. Even in a case where a light source device formed from a plurality of juxtaposed light sources of different colors is used as an illuminating light source, the viewing optical system allows observation of a clear color image free from chromatic aberration even if the observer's pupil position deviates from the exit pupil position.

What we claim is:

1. A viewing optical system comprising:

reflection type image display means placed in an image plane;

an ocular optical system for leading an image displayed on said reflection type image display means to a position of an exit pupil where an observer's eyeball is to be placed;

illuminating means placed at a position of an entrance pupil conjugate to said exit pupil with respect to said ocular optical system, said illuminating means being formed from a plurality of juxtaposed illuminating light sources of different colors;

illuminating light guide optical means for guiding an illuminating light beam from said illuminating means, said illuminating light guide optical means being placed between said entrance pupil and said reflection type image display means so that the illuminating light beam can be applied to a display surface of said reflection type image display means from a front side thereof; and chromatic aberration producing means placed between said entrance pupil and said illuminating light guide optical means, said chromatic aberration producing means being arranged to superimpose images of said plurality of illuminating light sources on one another in said exit pupil;

wherein said ocular optical system includes a decentered prism formed from a medium surrounded by three optical surfaces and having a refractive index larger than 1, said decentered prism having:

an entrance surface through which a display light beam reflected from said reflection type image display means enters said decentered prism after passing through said illuminating light guide optical means;

a first reflecting surface for reflecting the light beam entering through said entrance surface;

a second reflecting surface for reflecting the light beam reflected from said first reflecting surface; and an exit surface through which the light beam reflected from said second reflecting surface exits said decentered prism;

wherein said first reflecting surface and said exit surface are formed from a single surface serving as both a refracting surface and a reflecting surface.

2. A viewing optical system according to claim 1, wherein said reflection type image display means is a reflection type liquid crystal display device.

3. A viewing optical system according to claim 1 or 2, wherein said illuminating light guide optical means is a transparent member, said transparent member having:

a first surface through which the light beam emitted from said illuminating means enters said transparent member;

a second surface that totally reflects the light beam entering through said first surface; and a third surface that reflects the light beam totally reflected from said second surface;

wherein said second surface transmits the light beam reflected from said third surface to illuminate the display surface of said reflection type image display means from the front side thereof and also transmits the display light beam reflected from the display surface of said reflection type image display means, and said third surface forms a beam splitter surface that transmits the display light beam passing through said second surface.

4. A viewing optical system according to claim 3, wherein a diffractive optical element is provided on an entrance surface side of said decentered prism.

5. A viewing optical system according to claim 4, wherein said illuminating light guide optical means is a transparent member, said transparent member having:

a first surface through which the light beam emitted from said illuminating means enters said transparent member;

a second surface that totally reflects the light beam entering through said first surface; and a third surface that reflects the light beam totally reflected from said second surface;

wherein said second surface transmits the light beam reflected from said third surface to illuminate the display surface of said reflection type image display means from the front side thereof and also transmits the display light beam reflected from the display surface of said reflection type image display means, and said third surface forms a beam splitter surface that transmits the display light beam passing through said second surface.

6. A viewing optical system according to claim 5, wherein a deviation angle compensating member is placed on a third surface side of said transparent member to compensate for an angle of deviation caused by said transparent member.

7. A viewing optical system according to claim 5, wherein said third surface of said transparent member is a polarization beam splitter surface.

8. A viewing optical system according to claim 3, wherein at least one reflecting surface of said decentered prism is decentered with respect to an optical axis and has a rotationally asymmetric curved surface configuration that corrects decentration aberrations due to decentration of said at least one reflecting surface and gives a power to the light beam.

9. An image display apparatus comprising said viewing optical system according to claim 3, said viewing optical system being provided for one of a right eye and a left eye.

10. An image display apparatus comprising a pair of said viewing optical systems according to claim 3, said viewing optical systems being provided for a right eye and a left eye, respectively.

11. An image display apparatus according to claim 9, further comprising support means for supporting said image display apparatus on a head of an observer so that said image display apparatus is positioned in front of a face of the observer.

12. An image display apparatus according to claim 10, further comprising support means for supporting said image display apparatus on a head of an observer so that said image display apparatus is positioned in front of a face of the observer.

* * * * *